(12) United States Patent
Luo et al.

(10) Patent No.: US 8,501,655 B2
(45) Date of Patent: Aug. 6, 2013

(54) CATALYST ACTIVATORS, PROCESSES FOR MAKING SAME, AND USE THEREOF IN CATALYSTS AND POLYMERIZATION OF OLEFINS

(75) Inventors: Lubin Luo, Baton Rouge, LA (US); Steven P. Diefenbach, Baton Rouge, LA (US)

(73) Assignee: Albemarle Corporation, Baton Rouge, LA (US)

( * ) Notice: Subject to any disclaimer, the term of this patent is extended or adjusted under 35 U.S.C. 154(b) by 733 days.

(21) Appl. No.: 12/442,345

(22) PCT Filed: Sep. 17, 2007

(86) PCT No.: PCT/US2007/078629
§ 371 (c)(1), (2), (4) Date: Mar. 20, 2009

(87) PCT Pub. No.: WO2008/036594
PCT Pub. Date: Mar. 27, 2008

(65) Prior Publication Data
US 2010/0029470 A1  Feb. 4, 2010

Related U.S. Application Data

(60) Provisional application No. 60/846,065, filed on Sep. 20, 2006, provisional application No. 60/869,967, filed on Dec. 14, 2006.

(51) Int. Cl.
*B01J 31/14* (2006.01)
(52) U.S. Cl.
USPC .......................................................... 502/152
(58) Field of Classification Search
None
See application file for complete search history.

(56) References Cited

U.S. PATENT DOCUMENTS 7,034,173 B2 *  4/2006  Schottek ........................ 556/179

FOREIGN PATENT DOCUMENTS

| JP | 6 329 714 A2 | 11/1994 |
| JP | 2001-323009 A2 | 11/2001 |
| WO | WO 01/90112 A1 | 11/2001 |
| WO | WO 2007/005676 A2 | 1/2007 |
| WO | WO 2007/005921 A2 | 1/2007 |
| WO | WO 2007/076398 A2 | 7/2007 |

OTHER PUBLICATIONS

Russell A. Stapleton, et al; "Bulky Aluminum Alkyl Scavengers in Olefin Polymerization with Group 4 Catalysts"; Journal of the American Chemical Society; 2003; p. 9246-9247; vol. 125; American Chemical Society; Washington, D.C., US.
Gregory G. Hlatky, Et Al; "Supported Ionic Metallocene Polymerization Catalysts"; Macromolecules; 1996; vol. 29; pp. 8019-8020.
Nicolas Millot, Et Al; "Synthesis, Characterization, and Activity in Ethylene Polymerization of Silica Supported Cationic Cyclopentadienyl Zirconium Complexes"; Journal of the American Chemical Society; 2006; vol. 128; pp. 9361-9370.
Eugene You-Xian Chen, Et Al; Cocatalysts for Metal-Catalyzed Olefin Polymerization: Activators, Activation Processes, and Structure-Activity Relationships; Chemical Reviews; 2000; vol. 100; pp. 1391-1434.

* cited by examiner

*Primary Examiner* — Yun Qian
(74) *Attorney, Agent, or Firm* — James A. Jubinsky (57) ABSTRACT

Compositions useful for activating catalysts for olefin polymerization are provided. The compositions are derived from at least carrier having at least two hydrogen bonded hydroxyl groups, organoaluminum compound, Lewis base, and Bronsted acid, wherein the Lewis base and the Bronsted acid form at least one ionic Bronsted acid.

21 Claims, 5 Drawing Sheets

The IBA Single-Crystal Structure (the small circle O represents a proton)

Fig. 3

CATALYST ACTIVATORS, PROCESSES FOR MAKING SAME, AND USE THEREOF IN CATALYSTS AND POLYMERIZATION OF OLEFINS

BACKGROUND

Partially hydrolyzed aluminum alkyl compounds known as aluminoxanes (AO) are used for activating transition metals for olefin polymerization activity. One such compound, methylaluminoxane (MAO), is a frequently chosen aluminum co-catalyst/activator in the industry. Considerable effort has been devoted to improving the effectiveness of catalyst systems based on use of aluminoxanes, hydroxyaluminoxanes, or modified aluminoxanes for polymerization of olefins. Representative patents and publications in the field of aluminoxane usage include the following: U.S. Pat. No. 5,324,800 to Welborn et al.; U.S. Pat. No. 4,752,597 to Turner; U.S. Pat. Nos. 4,960,878 and 5,041,584 to Crapo et al.; WO 96102580 to Dall'occo, et al.; EP 0 277 003 and EP 0 277 004 to Turner; Hlatky. Turner, and Eckman, *J. Am. Chem. Soc.,* 1989, 111, 2728-2729; Hlatky and Upton, *Macromolecules,* 1996, 29, 8019-8020. U.S. Pat. No. 5,153,157 to Hlatky and Turner; U.S. Pat. No. 5,198,401 to Turner, Hlatky, and Eckman; Brintzinger, et al., *Angew. Chem. Int. Ed. Engl.,* 1995, 34, 1143-1170; and the like. Hydroxyaluminoxane compositions are disclosed in U.S. Pat. Nos. 6,562,991, 6,555,494, 6,492, 292, 6,462,212, and 6,160,145. Despite technological advances, many aluminoxane-based polymerization catalyst activators still lack the activity and/or thermal stability needed for commercial applicability, require commercially unacceptably high aluminum loading, are expensive (especially MAO), and have other impediments to commercial implementation.

U.S. Pat. No. 5,384,299 describes zwitterionic catalyst systems prepared by protolysis from dialkyl-metallocenes and borate anions. WO 91/09882 describes supported cationic metallocene catalysts based on the above-mentioned borate anion, wherein the catalyst system is formed by application of a dialkyl-metallocene compound and a Bronsted-acid, quaternary ammonium compound having a non coordinating anion, tetrakispentafluoroborate, to an inorganic support. The support is modified beforehand by means of a trialkylaluminum compound. One disadvantage of this method of application to a support is that only a small part of the metallocene used is immobilized by physisorbtion on the support material; and, thus, the metallocene is prone to detach from the support surface, which can ultimately lead to reactor fouling.

WO 96/04319 describes a catalyst system in which the borate activator anion is covalently bound to the support material directly through one oxygen atom of the metal oxide support. However, such a catalyst system has a low polymerization activity by commercial standards. Another disadvantage of such a catalyst system is described by Basset et al. (*J. Am. Chem. Soc.,* 128 (2006) 9361). Basset et al. describe catalyst deactivation pathways for such covalently bound (through one oxygen atom of the metal oxide, silica, support) borate activator anions as well as a deactivation pathway involving the reaction of the four member siloxane rings of the silica support (formed by calcination of the silica up to and greater than 600° C.). Deactivation pathways described in publications show the limitations of borate activator anions covalently bound to one oxygen atom of the metal oxide carrier and additionally, the importance of controlling the structures within the metal oxide carrier as a result of calcination.

Thus, there is a need for activator compositions that are stable to deactivation pathways and that exhibit high sustainable activity for commercial olefin polymerizations.

THE INVENTION

This invention meets the above-described needs by providing compositions comprising at least: a) Bronsted acidic cation $[Q_mH]^+$, wherein H is a proton, m is 1 or 2, each Q is Lewis base, and each Lewis base Q can be the same as, or different from, any other Lewis base Q; and b) aluminate anion chemically bonded to at least one carrier, wherein each of a majority of aluminum atoms in the aluminate anion is chemically bonded to at least two oxygen atoms on the surface of the carrier. Also provided are such compositions wherein the carrier contains at least two hydroxyl groups and wherein a majority of the hydroxyl groups are in hydrogen bonded form. Also provided are such compositions derived from at least: a) carrier having at least two hydroxyl groups; b) organoaluminum compound; e) the $Q_m$; and d) Bronsted acid. Thus, this invention provides activator compositions comprising at least one Bronsted acidic cation and at least one aluminate anion covalently bound to a low temperature calcined metal oxide carrier through two chelating oxygens.

This invention further meets the above-described needs by providing compositions derived from at least: a) carrier having at least two hydroxyl groups; b) organoaluminum compound; c) Lewis base; and d) Bronsted acid, wherein the Lewis base and the Bronsted acid form at least one ionic Bronsted acid; and such compositions wherein a majority of the hydroxyl groups are in hydrogen bonded form. Also provided are compositions derived from at least: a) compound derived from carrier having at least two hydroxyl groups and organoaluminum compound in such a manner that the ratio of (mmol OH on the carrier)/(g carrier) to (mmol organoaluminum compound)/(g carrier) is from about 1.80:1 to about 2.20:1; b) Lewis base; and c) Bronsted acid, wherein the Lewis base and the Bronsted acid form at least one ionic Bronsted acid. Also provided are compositions derived from at least: a) carrier having at least two hydroxyl groups; b) organoaluminum compound; and c) ionic Bronsted acid derived from amine and at least two equivalents of phenol per equivalent of the amine. This invention also provides methods of preparing compositions comprising combining at least: a) carrier having at least two hydroxyl groups, b) organoaluminum compound; c) Lewis base; and d) Bronsted acid, wherein the Lewis base and the Bronsted acid form at least one ionic Bronsted acid. In such compositions and methods, a majority of the hydroxyl groups can be in hydrogen bonded form. This invention also provides such compositions that are suitable for activating an alkylated transition metal component by protonation As will be familiar to those skilled in the art, the terms "combined" and "combining" as used herein mean that the components that are "combined" or that one is "combining" are put into a container with each other. Likewise a "combination" of components means the components having been put together in a container. This invention also provides such compositions and methods wherein the composition is an activator composition. Also, as used herein, the term "majority" means more than about seventy percent.

FIGURES

The invention will be better understood by reference to the Figures in which.

CARRIERS/SUPPORTS

Carriers having at least two hydrogen bonded hydroxyl groups, e.g., at least one pair of hydrogen bonded hydroxyl groups, useful in compositions according to this invention comprise inorganic carriers or organic carriers. Such carriers are either non-calcined or low-temperature calcined. As used herein, a "non-calcined" carrier is a carrier that has not purposely been subjected to calcining treatment, and a "low-temperature calcined" carrier is carrier that has been calcined at a temperature up to about 400° C., or about 100° C. to about 400° C., or at about 200° C. The calcination time can be about 1 to about 24 hours. Further, the calcination may be performed in any atmosphere, for example, in an atmosphere of air or an inert gas such as nitrogen, or under a vacuum. We have observed that such non-calcined or low-temperature calcined carriers, e.g., silicas, have an increased concentration of hydrogen bonded hydroxyl groups and a negligible amount of strained siloxane rings. See also M. E. Bertram et al., *J. Phys. Chem.*, 1991, Vol. 95, pp. 4453-4463.

A plurality of carriers can be used as a mixture. A carrier of this invention may be porous and have a micro pore volume of not less than 0.1 ml/g of silica, or not less than 0.3 ml/g. A carrier of this invention may have a micro pore volume of about 1.6 ml/g of silica. The average particle diameter of the carrier may be from about 5 micrometers to about 1000 micrometers, or from about 10 micrometers to about 500 micrometers.

One silica useful in this invention is porous and has a surface area in the range of from about 1.0 $m^2$/g silicate about 1000 $m^2$/g silica, including the range of about 10 $m^2$/g silica to about 700 $m^2$/g silica, a total pore volume in the range of from about 0.1 cc/g silica to about 4.0 cc/g silica, and an average particle diameter in the range of from about 10 micrometers to about 500 micrometers. A silica useful in this invention can have a surface area in the range of from about 50 $m^2$/g to about 500 $m^2$/g, a pore volume in the range of from about 0.5 cc/g to about 3.5 cc/g, and an average particle diameter in the range of from about 15 micrometers to about 150 micrometers. A useful silica may have a surface area in the range of from about 200 $m^2$/g to about 350 $m^2$/g, a pore volume in the range of from about 1.0 cc/g to about 2.0 cc/g, and an average particle diameter in the range of from about 10 micrometers to about 110 micrometers.

An average pore diameter of a typical porous silicon dioxide carrier useful in this invention is in the range of from about 10 angstroms to about 1000 angstroms, or from about 50 angstroms to about 500 angstroms, or from about 175 angstroms to about 350 angstroms. A typical content of hydroxyl groups in carriers of this invention is from about 2.5 mmol OH/g silica to about 4.0 mmol OH/g silica, as determined by titration with triethylaluminum. Most of these active OH groups react readily with triethylaluminum to produce ethane, and this reaction can be used to quantify the concentration of active OH groups on a particular silica. A typical content of hydroxyl groups is from about 0.10 mmol OH/g silica to about 10 mmol OH/g silica, or about 1.0 mmol OH/g silica to about 5.0 mmol OH/g silica, or from about 2.5 mmol OH/g silica to about 4.0 mmol OH/g silica.

Example inorganic carriers that may be useful in this invention include inorganic oxides, magnesium compounds, clay minerals and the like. The inorganic oxides can comprise silica, alumina, silica-alumina, magnesia, titania, zirconia, and clays. Example inorganic oxides useful in this invention include, without limitation, $SiO_2$, $Al_2O_3$, MgO, $ZrO_2$, $TiO_2$, $B_2O_3$, CaO, ZnO, BaO, $ThO_2$ and double oxides thereof, e.g. $SiO_2$—$Al_2O_3$, $SiO_2$—MgO, $SiO_2$-$iO_2$, $SiO_2$—$TiO_2$—MgO. Example magnesium compounds useful in this invention include partially hydrolyzed $MgCl_2$, MgCl(OEt) and the like. Example clay minerals that may be useful in this invention include kaolin, bentonite, kibushi clay, geyloam clay, allophane, hisingerite, pyrophylite, talc, micas, montmorillonites, vermiculite, chlorites, palygorskite, kaolinite, nacrite, dickite, halloysite and the like.

Example organic carriers that may be useful in this invention include acrylic polymer, styrene polymer, ethylene polymer, propylene polymer and the like. Example acrylic polymers that may be useful in this invention include derivatives of polymers of acrylic monomers such as acrylonitrile, methyl acrylate, methyl methacrylate, methacrylonitrile and the like, which derivatives have at least two hydrogen bonded hydroxyl groups, and copolymers of the monomers and crosslinking polymerizable compounds having at least two unsaturated bonds. Example styrene polymers that may be useful in this invention include derivatives of polymers of styrene monomers such as styrene, vinyltoluene, ethylvinylbenzene and the like, which derivatives have at least two hydrogen bonded hydroxyl groups, and copolymers of the monomers and crosslinking polymerizable compounds having at least two unsaturated bonds. Example crosslinking polymerizable compound having at least two unsaturated bonds include derivatives of divinylbenzene, trivinylbenzene, divinyltoluene, divinylketone, diallyl phthalate, diallyl maleate, N,N'-methylenebisacrylamide, ethylene glycol dimethacrylate, polyethylene glycol dimethacrylate and the like, which derivatives have at least two hydrogen bonded hydroxyl groups.

Organic carriers useful in this invention can have at least one polar functional group in addition to the at least two hydrogen bonded hydroxyl groups. Examples of these carriers include derivatives of primary amino group, secondary amino group, imino group, amide group, imide group, hydrazide group, amidino group, hydroxyl group, hydroperoxy-group, carboxyl group, formyl group, methyloxycarbonyl group, carbamoyl group, sulfo group, sulfino group, sulfeno group, thiol group, thiocarboxyl group, thioformyl group, pyrrolyl group, imidazolyl group, piperidyl group, indazolyl group and carbazolyl group, which derivatives have at least two hydrogen bonded hydroxyl groups. When the polar organic carrier originally has at least two hydrogen bonded hydroxyl groups, the organic carrier can be used as it is.

Organoaluminum Compounds

Organoaluminum compounds useful in this invention can comprise $AlR_n(XR^1)_{(3-n)}$ wherein Al is aluminum; each R is hydrogen or a hydrocarbyl group having up to about 20 carbon atoms, and each R may be the different from, any other R; for each $XR^1$, X is a hetero atom and $R^1$ is an organic group bonded to the Al through the hetero atom and having up to about 20 carbon atoms; each $XR^1$ may be the same as, or different from, any other $XR^1$; and n is 1, 2, or 3. Each R can be a straight-chain or branched alkyl group. Non-limiting examples of R include alkyl groups having from 1 to about 10 carbon atoms such as methyl, ethyl, n-propyl, isopropyl, n-butyl, isobutyl, n-pentyl, neopentyl and the like.

Non-limiting examples of $AlR_nXR^1_{(3-n)}$ useful in this invention include triethylaluminum, triisobutylaluminum, trimethylaluminum, trioctylaluminum, diisobutylaluminum hydride, diethylaluminum hydride, dimethylaluminum hydride, (2,6-di-tert-butyl-4-methylphenoxy)diisobutylaluminum, bis(2,6-di-tert-butyl4-methylphenoxy)isobutylaluminum, bis(2,6-di-tert-butyl-4-methylphenoxy)diethylaluminum, bis(2,6-di-tert-butyl-4-methylphenoxy)ethylaluminum, (2,6-di-tert-butyl-4-methylphenoxy)dimethylaluminum, or bis(2,6-di-tert-butyl-4-methylphenoxy)methylaluminum, (pentafluorophenoxide)dimethylaluminum, bis(pentafluorophenoxide)methylaluminum, (pentafluorophenoxide)diethylaluminum, bis(pentafluorophenoxide)ethylaluminum, and mixtures thereof. Examples of hetero atoms include nitrogen atom, oxygen atom, phosphorous atom, sulfur atom and the like.

Organoaluminum compounds of this invention can be prepared by any suitable method, including currently known methods, as will be familiar to those skilled in the art, or methods that may come to be known.

Lewis Bases

Lewis base can comprise primary amine $NH_2R^2$, secondary amine $NHR^2_2$, or tertiary amine $NR^2_3$, or any mixture thereof, wherein $R^2$ in each occurrence is hydrogen or hydrocarbyl group having up to about 20 carbon atoms, and each $R^2$ may be the same as, or different from, any other $R^2$. For example, Lewis base can comprise a variety of amines, including, but not limited to, $NMe_2Ph$, $NMe_2(CH_2Ph)$, $NEt_2Ph$, $NEt_2(CH_2Ph)$, or Lewis base can comprise one or more long chain amines such as $NMe(C_pH_{2p+1})(C_mH_{2m+1})$, $NMe_2(C_pH_{2p+1})$, $NEt(C_pH_{2p+1})(C_mH_{2m+1})$, or $NEt_2(C_pH_{2p+1})$, wherein p and m are selected independently from an integer from about 3 to about 20. Examples of long chain amines of the formula $NMe(C_pH_{2p+1})(C_mH_{2m+1})$ include, but are not limited to, compounds such as $NMe(C_{15}H_{33})_2$, $NMe(C_{17}H_{35})_2$, $NMe(C_{18}H_{37})_2$, $NMe(C_{16}H_{33})(C_{17}H_{35})$, $NMe(C_{16}H_{33})(C_{18}H_{37})$, $NMe(C_{17}H_{35})(C_{18}H_{37})$ and the like. For example, $NMe(C_{16}H_{33})_2$ is typically the major species in a commercial long chain amine composition that usually comprises a mixture of several amines. Lewis base may comprise $NMe_2Ph$, $NMe_2(CH_2Ph)$, $NEt_2Ph$, $NEt_2(CH_2Ph)$, $NMe(C_{18}H_{33})_2$. Lewis base can also comprise phosphines, Lewis base can comprise N,N-dimethylbenzylamine, trimethylamine, N,N-dimethylaniline, triethylamine, and the like.

Bronsted Acids

Bronsted acid, i.e., a compound capable of donating a proton, useful in this invention can comprise $R^4OH$, wherein $R^4$ is an organic compound containing at least one electron withdrawing group. The Bronsted acid can be 2,6-difluorophenol, pentafluophenol, 4-fluorophenol or any phenol that is able to react with Lewis base to form at least one ionic Bronsted acidic compound.

Ionic Bronsted Acids

In this invention, the Lewis base and the Bronsted acid form at least one ionic Bronsted acid, ionic Bronsted acid can be derived from Lewis base and Bronsted acid in such a way that the Bronsted acid proton transfers to the Lewis base. The ionic Bronsted acid can have a characteristic N—H bond as determined by x-ray crystal structure and conductivity measurements, as will be familiar to those skilled in the art.

Preparation of Compositions of this Invention

Activator compositions according to this invention can be derived from at least carrier having at least two hydrogen bonded hydroxyl groups, organoaluminum compound, Lewis base, and Bronsted acid. The carrier can be combined with the organoaluminum compound to form first product, at least a portion of the first product can be combined with ionic Bronsted acid derived from Lewis base and Bronsted acid in amounts sufficient and under condition sufficient to form the ionic Bronsted acid. The ionic Bronsted acid can be derived from amine and at least two equivalents of phenol per equivalent of the amine. The ionic Bronsted acid can be added to organoaluminum treated carrier in such a way to form a N—H stretching frequency in the IR spectrum characteristic of formation of the Bronsted acid activator, e.g., at about 3250 $cm^{-1}$.

The carrier can be combined with the organoaluminum compound to form first product, at least a portion of the first product can be combined with the Bronsted acid to form second product, and at least a portion of the second product can be combined with the Lewis base. The organoaluminum compound can be combined with Lewis base to form first product, at least a portion of the first product can be combined with the carrier to form second product, and at least a portion of the second product can be combined with ionic Bronsted acid derived from Lewis base and Bronsted acid in amounts sufficient and under condition sufficient to form the ionic Bronsted acid.

In this invention, each of a majority of the organoaluminum compounds can react with the carrier in such a way that a chelating aluminum center can form with the two oxygen atoms (as the chelating donors) on a pair of hydrogen bonded hydroxyl groups on the surface of the carrier. This invention thus provides that the carrier having at least two hydrogen bonded hydroxyl groups and the organoaluminum compound can be combined in such amounts that the ratio of (mmol OH on the carrier)/(g carrier) to (mmol organoaluminum compound)/(g carrier) is from about 1.80:1 to about 2.20:1, or about 1.85:1 to about 2.05:1, or about 2:1. Inert OH groups under the surface are not considered to be reactive. Therefore, the OH content should be determined by a chemical method, e.g., organoaluminum or organomagnesium titration, not by a physical method, e.g., the weight loss through heating.

The combining can be conducted in an inert gas atmosphere; at a temperature from about −80° C. to about 200° C. or from about 0° C. to about 120° C.; the combining time can be from about 1 minute to about 36 hours, or from about 10 minutes to about 24 hours. Solvent used for preparing activator composition can comprise aliphatic solvent or aromatic solvent, either of which is inert to the carrier, the organoaluminum compound, the Lewis base, the Bronsted acid, and the ionic Bronsted acid. Example treatments after completion of the combining operation include filtration of supernatant, followed by washing with inert solvent and evaporation of solvent under reduced pressure or in inert gas flow, but these treatments are not required. Resulting activator composition can be used for polymerization in any suitable state, including fluid, dry, or semi-dry powder, and may be used for polymerization in the state of being suspended in inert solvent. The combining of carrier having at least two hydrogen bonded hydroxyl groups with organoaluminum compound can be conducted at ambient temperature and at a combining time of from about 15 minutes to about 48 hours, or from about 15 minutes to about 6 hours; the resulting combination can be used as is or subsequently heated to a temperature of about 40° C. to about 120° C. Alternatively, the combining of carrier having at least two hydrogen bonded hydroxyl groups with organoaluminum compound can be conducted at a temperature of from about 40° C. to about 120° C. at a combining time of from about 15 minutes to about 8 hours. At least a portion of resulting product is combined with ionic Bronsted acid, which is separately derived from Lewis base and Bronsted acid, for example, from amine and at least two equivalents of phenol per equivalent of the amine.

Trialkylaluminum compound can be combined with phenol, such as BHT or pentafluorophenol, to form a first product which can then be combined with carrier having at least two hydrogen bonded hydroxyl groups and amine, such as N,N-dimethylbenzylamine, trimethylamine, N,N-dimethylaniline, and/or triethylamine, to form an activator composition, all such that the activator composition comprises at least two equivalents of phenol per equivalent of the amine.

The amount of aluminum atoms in the product, e.g., solid component, obtained by combining low-temperature calcined carrier and trialkylaluminum compound can be not less than about 0.1 mmol aluminum atom, or not less than about 1 mmol aluminum atom, in 1 g of the solid component in the dry state. When solid component obtained fey combining low-temperature calcined carrier and trialkylaluminum compound is combined with ionic compound having at least one active proton, the molar ratio of active proton to aluminum atom of trialkylaluminum compound in the solid component can be from about 0.02 to about 1, or from about 0.05 to about 0.5, or from about 0.1 to about 0.3.

Catalysts for Olefin Polymerization

Activator compositions of this invention are useful in catalysts for olefin polymerization. Activator composition according to this invention and transition metal component may each be added independently, yet substantially simultaneously, to monomer to catalyze polymerization. Activator composition and transition metal component may be combined to form product and at least a portion of product may be added to monomer to catalyze polymerization. The active proton ratio of activator composition to transition metal atom of transition metal component may be 0.1 to 4, or 0.5 to 2, or almost 1.

Activator composition is suitable for activating transition metal component by Bronsted acidity, i.e., by protonating alkylated transition metal component. Activator composition is also suitable for activating transition metal component by Lewis acidity, i.e., by accepting at least one electron pair from transition metal component. The amount of activator composition combined with transition metal component may be sufficient to allow activation of transition metal component predominantly by Bronsted acidity; e.g., 30% or more, 70% or more, or 90% or more of activation may occur due to Bronsted acidity. The amount of activator composition combined with transition metal component may be sufficient to allow activation of transition metal component substantially by Bronsted acidity, e.g., 95% or more, or 98% or more of activation may occur due to Bronsted acidify. Activator composition may be combined with transition metal component either before combining with monomer or while simultaneously combining with monomer. Given a known activator composition and a known transition metal component, one skilled in the art can determine the amount of the activator composition to combine with transition metal component to allow activation predominantly or substantially by Bronsted acidity.

Catalysts for Olefin Polymerization—Transition Metal Component

Transition metal component can comprise any alkylated transition metal component having olefin polymerization potential. For example, without limitation, transition metal component can comprise one or more metallocene transition metal components.

Transition metal component can comprise alkylated catalyst precursor $ML_a R_{q-a}$ (wherein M represents transition metal atom of the 4th Group or Lanthanide Series of the Periodic Table of Elements (1993, IUPAC), and examples thereof include transition metals of the 4th Group of the Periodic Table, such as titanium atom, zirconium atom and hafnium atom and transition metals of the Lanthanide Series, such as samarium; L represents group having cyclopentadienyl skeleton or group having at least one hetero atom, at least one L being group having cyclopentadienyl skeleton, and a plurality of L may be the same or different and may be crosslinked to each other; R represents hydrocarbon group having 1 to about 20 carbon atoms; "a" represents a numeral satisfying the expression $0<a\leqq q$; and q represents valence of transition metal atom M).

In L in transition metal component, group having cyclopentadienyl skeleton can comprise, for example, cyclopentadienyl group, substituted cyclopentadienyl group or polycyclic group having cyclopentadienyl skeleton. Example substituted cyclopentadienyl groups include hydrocarbon group having 1 to about 20 carbon atoms, halogenated hydrocarbon group having 1 to about 20 carbon atoms, silyl group having 1 to about 20 carbon atoms and the like. Silyl group according to this invention can include $SiMe_3$ and the like. Examples of polycyclic group having cyclopentadienyl skeleton include indenyl group, fluorenyl group and the like. Examples of hetero atom of the group having at least one hetero atom include nitrogen atom, oxygen atom, phosphorous atom, sulfur atom and the like.

Example substituted cyclopentadienyl groups include methylcyclopentadienyl group, ethylcyclopentadienyl group, n-propylcyclopentadienyl group, n-butylcyclopentadienyl group, isopropylcyclopentadienyl group, isobutylcyclopentadienyl group, sec-butylcyclopentadienyl group, tertbutylcyclopentadienyl group, 1,2-dimethylcyclopentadienyl group, 1,3-dimethylcyclopantadienyl group, 1,2,3-trimethylcyclopentadienyl group, 1,2,4-trimethylcyclopentadienyl group, tetramethylcyclopentadienyl group, pentamethylcyclopentadienyl group and the like.

Example polycyclic groups having cyclopentadienyl group include indenyl group, 4,5,6,7-tetrahydroindenyl group, fluorenyl group and the like.

Example groups having at least one hetero atom include methylamino group, tert-butylamino group, benzylamino group, methoxy group, tert-butoxy group, phenoxy group, pyrrolyl group, thiomethoxy group and the like.

One or more groups having cyclopentadienyl skeleton, or one or more group having cyclopentadienyl skeleton and one or more group having at least one hetero atom, may be crosslinked with (i) alkylene group such as ethylene, propylene and the like; (ii) substituted alkylene group such as isopropylidene, diphenylmethylene and the like; or (iii) silylene group or substituted, silylene group such as dimethylsilylene group, diphenylsilylene group, methylsilylsilylene group and the like.

R in transition metal component comprises hydrogen or hydrocarbon group having 1 to about 20 carbon atoms. Examples of R include alkyl group having 1 to about 20 carbon atoms such as methyl group, ethyl group, n-propyl group, isopropyl group, n-butyl group, benzyl group and the like.

Examples of transition metal component $ML_a R_{q-a}$, wherein M comprises
zirconium, include bis(cyclopentadienyl)zirconiumdimethyl,
bis(methylcyclopentadienyl)zirconiumdimethyl,
bis(pentamethylcyclopentadienyl)zirconiumdimethyl, bis(indenyl)zirconiumdimethyl, bis(4,5,6,7-tetrahydroindenyl)zirconiumdimethyl, bis(fluorenyl)zirconiumdimethyl,
ethylenebis(indenyl)zirconiumdimethyl,
dimethylsilylene(cyclopentadienylfluorenyl)zirconiumdimethyl,
diphenylsilylenebis(indenyl)zirconiumdimethyl,
cyclopentadienyldimethylaminozirconiumdimethyl, cyclopentadienylphenoxyzirconium
dimethyl, dimethyl(tert-butylamino)(tetramethylcyclopentadienyl)
silanezirconiumdimethyl, isopropylidene(cyclopentadienyl)
3-tert-butyl-5-methyl-2-phenoxy)zirconiumdimethyl,
dimethylsilylene(tetramethylcyclopentadienyl)(3-tertbutyl-5-methyl-2-phenoxy) zirconiumdimethyl and the like.
Additional exemplary transition metal components $ML_a R_{q-a}$ include components wherein zirconium is replaced with titanium or hafnium in the above zirconium components.

Other alkylated catalyst precursors useful in this invention are:
rac-dimethylsilylbis(2-methyl-4-phenyl-indenyl)zirconium dimethyl (M1); rac-dimethylsilylbis(2-methyl-1-indenyl) zirconium dimethyl (M2); rac-dimethylsilylbis(2-methyl-4,5-benzoindenyl)zirconium dimethyl (M3); rac-ethylenebis(tetrahydroindenyl)-zirconium dimethyl (M4), and rac-ethylenebis(indenyl) zirconium dimethyl (M5). Alkylated catalyst precursor can be generated in-situ through reaction of alkylation agent with the halogenated version of the catalyst precursor. For example, bis(cyclopentadienyl) zirconium dichloride can be treated with triisobutylaluminum (TIBA) and then combined with activator composition.

Polymerization Using Activator Compositions of this Invention

When using activator compositions of the present invention in polymerization, any olefin or diolefin having 2 to 20 carbon atoms can be used as a monomer for polymerization. Specific examples thereof include ethylene, propylene, butene-1, pentene-1, hexene-1, heptene-1, octene-1, nonene-1, decene-1, hexadecene-1, eicocene-1,4-methylpentene-1,5-methyl-2-pentene-1, vinylcyclohexane, styrene, dicyclopentadiene, norbornene, 5-ethylidene-2-norbornene and the like, but are not limited thereto. In the present invention, copolymerization can be conducted using two or more monomers, simultaneously. Specific examples of the monomers constituting the copolymer include ethylene/an α olefin such as ethylene/propylene,
ethylene/butene-1, ethylene/hexene-1, ethylene/propylene/ butene-1,
ethylene/propylene/5-ethylidene-2-norbornene and the like, propylene/butene-1, and the like, but are not limited thereto.

The polymerization method is not limited, and both liquid phase polymerization method and gas phase polymerization method can be used. Examples of solvent used for liquid phase polymerization include aliphatic hydrocarbons such as butane, pentane, heptane, octane and the like; aromatic hydrocarbons such as benzene, toluene and the like; and hydrocarbon halides such as methylene chloride and the like, it is also possible to use at least a portion of the olefin to be polymerized as a solvent. The polymerization can be conducted in a batch-wise, semibatch-wise or continuous manner, and polymerization may be conducted in two or more stages which differ in reaction conditions. The polymerization temperature can be from about −50° C. to about 200° C., or from 0° C. to about 100° C. The polymerization pressure can be from atmospheric pressure to about 100 kg/cm², or from atmospheric pressure to about 50 kg/cm². Appropriate polymerization time can be determined by means known to those skilled in the art according to the desired olefin polymer and reaction apparatus, and is typically within the range from about 1 minute to about 20 hours. In the present invention, a chain transfer agent such as hydrogen may be added to adjust the molecular weight of olefin polymer to be obtained in polymerization.

Organoaluminum compound can be added during polymerization to remove impurities, such as water. Organoaluminum compound useful herein can comprise a variety of organoaluminum compounds, including at least one currently known organoaluminum compound, for example, organoaluminum compound $R^3_c AlY_{3-c}$ (wherein $R^3$ represents a hydrocarbon group having 1 to about 20 carbon atoms; Y represents hydrogen atom and/or halogen atoms; and "c" represents an integer of 0 to 3). Specific examples of $R^3$ include methyl group, ethyl group, n-propyl group, n-butyl group, isobutyl group, n-hexyl group and the like. Specific examples of the halogen atom for Y include fluorine atom, chlorine atom, bromine atom and iodine atom. Specific examples of the organoaluminum compound $R^3_c AlY_{3-c}$ include trialkylaluminums such as trimethylaluminum, triethylaluminum, tri-n-propylaluminum, trisobutylaluminum, tri-n-hexylaluminum and the like; dialkylaluminum chloride such as dimethylaluminum chloride, diethylaluminum chloride, di-n-propylaluminum chloride, diisobutylaluminum chloride, di-n-hexylaluminum chloride and the like; alkylaluminum dichlorides such as methylaluminumdichloride, ethylaluminum dichloride, n-propylaluminum dichloride, isobutylaluminum dichloride, n-hexylaluminum dichloride and the like; and dialkylaluminum hydrides such as dimethylaluminum hydride, diethylaluminum hydride, di-n-propylaluminum hydride, diisobutylaluminum hydride, di-n-hexylaluminum hydride and the like.

EXAMPLES

The following examples are illustrative of the principles of this invention. It is understood that this invention is not limited to any one specific embodiment exemplified herein, whether in the examples or the remainder of this patent application.

Example 1

IBA Formation and Structure Determination 1.1 Preparation of Ionic Bronsted Acid (IBA)

Figure 1A:
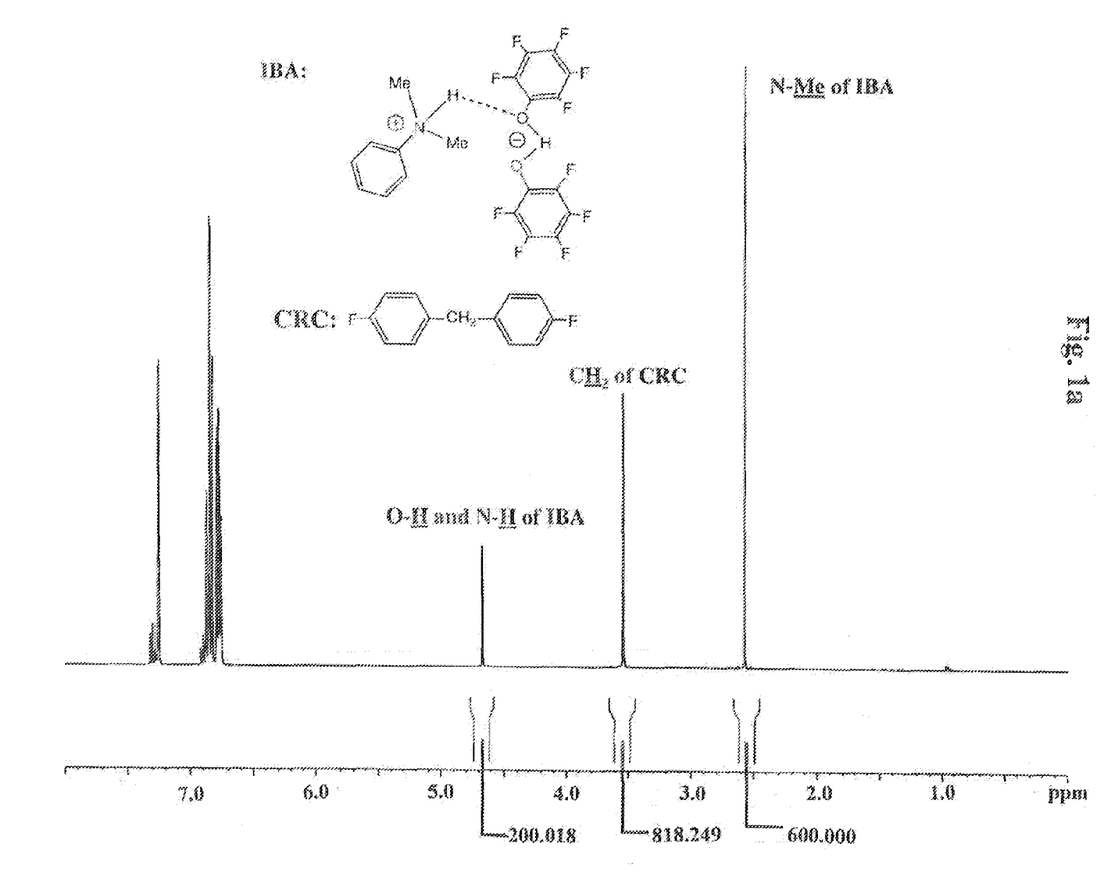
FIG. 1a is a $^1$H NMR spectrum of an IBA crystalline material in $C_6D_6$, as described herein.
Figure 1B:
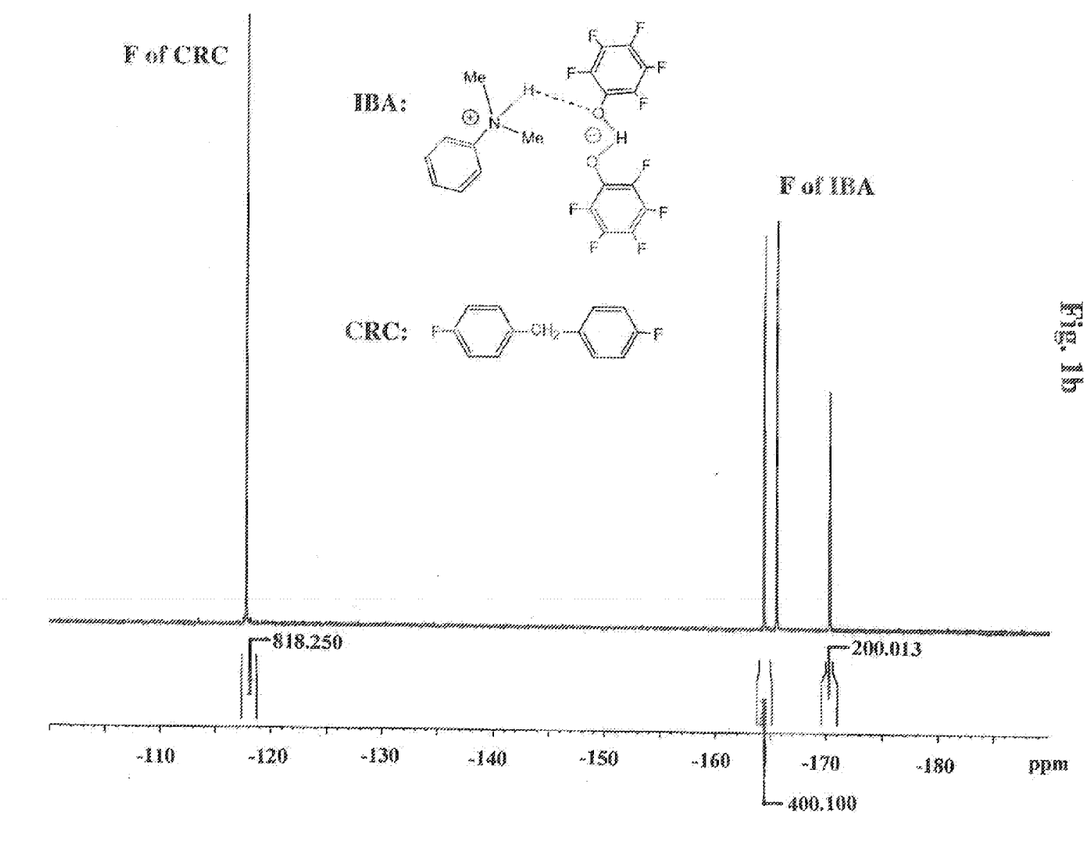
FIG. 1b is a $^{19}$F NMR spectrum of an IBA crystalline material in $C_6D_6$, as described herein.
Figure 1C:
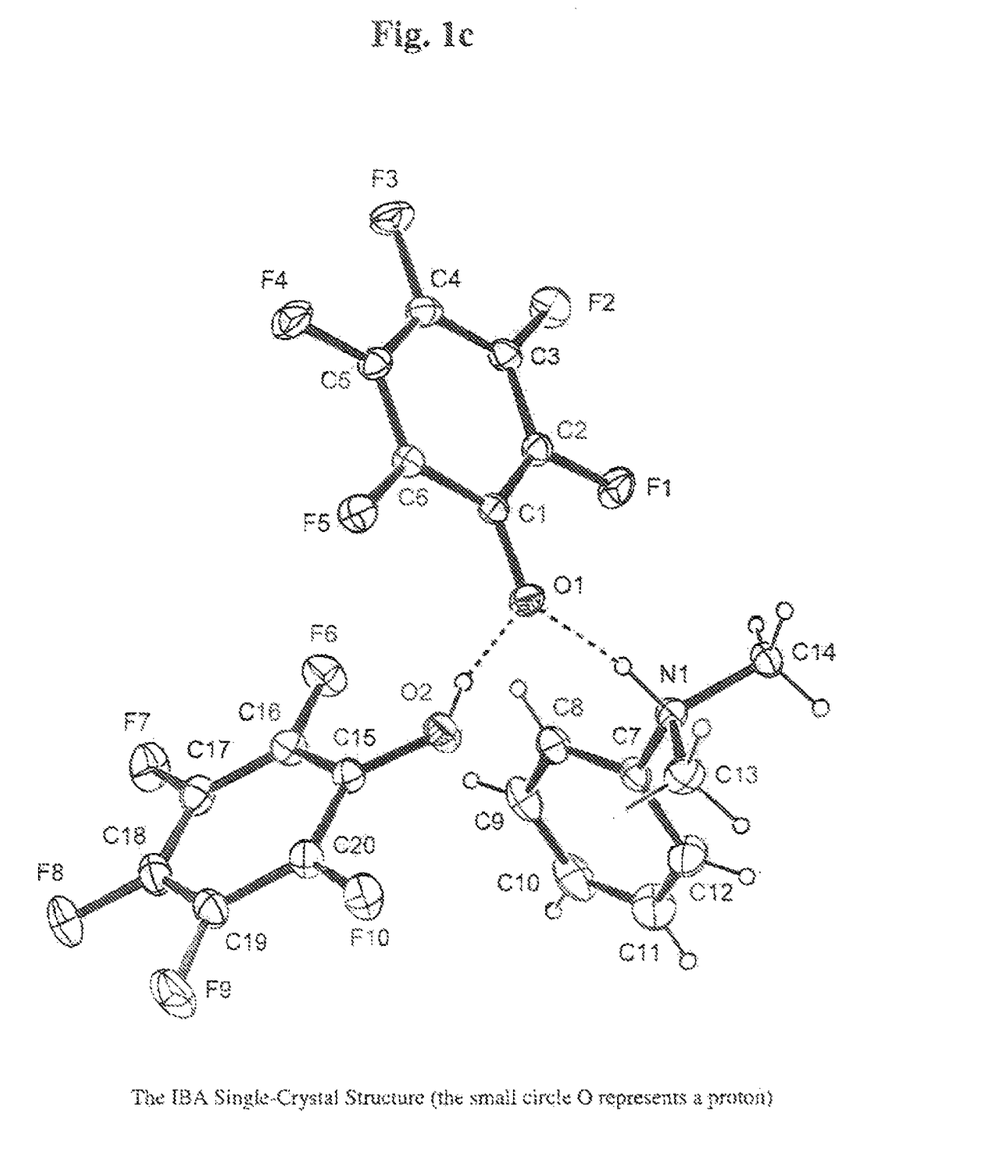
FIG. 1c is an ORTEP plot of an IBA crystalline material, as described herein.

In a drybox, 0.189 g (1.03 mmol) of $C_6F_5OH$ (pentafluorophenol) was mixed with about 2 g of isohexane in a container. About 0.125 g (1.02 mmol) of $NMe_2Ph$ (N, N-dimethylaniline) was weighed into a 4 mL vial with about 1 g of isohexane. The solution of $NMe_2Ph$ was then added to the $C_6F_5OH$ solution and mixed well. The resulting solution was allowed to settle. Crystalline material formed after about 2 minutes. After a few hours the mixture was filtered, washed with isohexane several times, and dried under vacuum to constant weight. The resulting crystalline material was dissolved in deuterated benzene ($C_6D_6$) and analyzed with $^1H$ and $^{19}F$ NMR spectroscopy to quantify the ratio of $NMe_2Ph$ to $C_6F_5OH$ based on a cross reference compound (CRC) bis(4-fluorophenyl) methane, which shows both proton and fluorine signals in $^1H$ and $^{19}F$ NMR spectra, respectively. The spectra showed that the solid had a composition of two moles of pentafluorophenol per mole of N, N-dimethylaniline(FIG. 1a ($^1H$ NMR) and FIG. 1b ($^{19}F$ NMR)). The crystalline material was also sent for X-ray single crystal diffraction analysis, which confirmed such a 2:1 structure (see ORTEP plot in FIG. 1c). Major NMR assignments: $^1H$ NMR (400 MHz, 25° C., $C_6D_6$): IBA: δ2.5 (s, 6H, Me), δ4.4 (s, 2H, OH & NH); CRC: δ3.6 (s, 2H, $CH_2$); $^{19}F$ NMR (400 MHz, 25°C., $C_6D_6$): IBA: δ-165 (m, 4F, $C_6F_5$-), δ-166 (m, 4F, $C_6F_5$-), δ-170 (m, 2F, C6$F_5$-); CRC: δ-118 (m, 2F, F-Ph).

(IBA)

1.2 Conductivity Test of IBA

Table 1 lists the conductivity of several samples.

TABLE 1

Conductivity Results Obtained in $CH_3CN$ Solution at Room Temperature

| | Sample No. | | | |
|---|---|---|---|---|
| | 1 | 2 | 3 | 4 |
| | | Sample | | |
| | $C_6F_5OH$ only | $PhNMe_2$ only | $C_6F_5OH$ + $PhNMe_2$ (1:1) | $C_6F_5OH$ + 0.5 $PhNMe_2$ (2:1) |
| Concentration (mmol/g) of phenol | 1.09 | 1.09[1] | 1.09 | 1.09 |
| Conductivity (microsec/cm) | 314 | 92.9 | 2,217 | 2,049 |

[1] concentration of amine (since no phenol included)

The increases in conductivity of samples 3 and 4 (over that of samples 1 and 2) confirm the formation of ionic species. In sample 3, the excess amine adds to the conductivity, but not substantially. The excess amount of amine in the 1:1 charged sample (sample 3) does not form significantly more ionic compound. Therefore, a 1:1 charge of the two components only forms 0.5 equivalent of the ionic species with 0.5 equivalent of excess amine. The conductivity results indicate that the basic 2 to 1 structure of IBA in the solid form remains intact when the IBA is dissolved in a solvent.

Example 2

Metallocenes Activated with IBA Derived Supported Activators 2.1 Organoaluminum Treated Silica with Sub-Stoichiometric Charge Based on OH Content on Silica In a drybox with inert atmosphere, a 250 mL three-neck round bottom flask was equipped with a mechanical stirrer and placed in an oil-bath. At room temperature, Grace 952 silica, which had been calcined at 200° C. for 4 hours (21.3 g, OH=3.26 mmol/g from TEA titration, see Example 4.2-1, total TEA reactive OH=21.3×3.26=69.4 mmol) was charged into the flask with 91 g toluene. Triethylaluminum ("TEA") (4.2 g, 36.8 mmol, based on 53 mol % of OH on silica) and toluene (12 g) were charged to a 4 mL vial. The TEA solution was then slowly added to the silica slurry. The resulting mixture was stirred at ambient conditions for 30 minutes; then the mixture was heated to 70° C. and held at that temperature for two hours. The mixture was then filtered, washed 3 times with 10 g toluene and 20 g isohexane, and then dried under vacuum for 3 hours. The yield was 23.9 g (ICP: Al 4.15%; active proton was not detected by NMR-Grignard titration: Al:Al-Et=1:1.17 by gas evolution). Samples of trimethylaluminum ("TMA") and triisobutylaluminum ("TIBA") treated silica were also prepared with similar procedures and the results are provided in Table 2.1. The performance and polymer morphology from both PE and PP catalysts derived from the organoaluminum treated silica containing up to 1:1.2 of Al:Al—R ratio (mol:mol) are provided in Table 2.2.

TABLE 2.1

Analytical Data for Organoaluminum Treated Silica

| Entry | Silica (calcination temp. °C.) | OH on silica (mmol OH on silica/g silica) | $AlR_3$ Treated Silica | | | | |
|---|---|---|---|---|---|---|---|
| | | | $AlR_3$ | Charge (mmol Al on $AlR_3$/g silica) | Found[1] (mmol Al/g silica) | $OH^2$ Residue (mmol OH/g silica) | Al:Al—R (mol:mol) |
| For Use in Example 2 (2.2) | | | | | | | |
| 2.1-1 | Grace 952 (200) | 3.2 | $AEt_3$ | 1.73 | 1.73 | 0 | 1:1.2 |
| 2.1-2 | Grace 952 (200) | 3.2 | $AlEt_3$ | 1.72 | 1.66 | 0 | 1:1.1 |
| 2.1-3 | Grace 952 (200) | 3.2 | $AlMe_3$ | 1.73 | 1.68 | 0.028 | — |
| 2.1-4 | Grace 952 (200) | 3.2 | $Al^iBu_3$ | 1.70 | 1.45 | 0 | 1:1.1 |
| 2.1-5 | Grace 952 (200) | 3.2 | $AlMe_3$ | 1.34 | 1.33 | 0.25 | — |

TABLE 2.1-continued

Analytical Data for Organoaluminum Treated Silica

| Entry | Silica (calcination temp. °C.) | OH on silica (mmol OH on silica/g silica) | AlR₃ | Charge (mmol Al on AlR₃/g silica) | Found[1] (mmol Al/g silica) | OH[2] Residue (mmol OH/g silica) | Al:Al—R (mol:mol) |
|---|---|---|---|---|---|---|---|
| | | | | For Use in EXAMPLE 3 (Comparative examples) | | | |
| 2.1-6 | Grace 952 (200) | 3.2 | AlMe₃ | 1.90 | 1.89 | 0 | 1:1.4 |
| 2.1-7 | Grace 952 (600) | 1.05 | AlMe₃ | 0.90 | 0.73 | 0 | — |

[1]This number is calculated based on the ICP Al % analysis and converted from mmol/(g sample) listed in Table 2.2, column of Al on silica, to mmol/(g silica) with a correction factor of silica percentage in the sample. For example, Example 2.1 shows that 21.3 g silica results in 23.9 g TEA treated silica after TEA treatment. Therefore, the correction factor is 23.9/21.3 = 1.12. Therefore, The Al loading 1.54 mmol/(g sample) in Table 2.2 Entry 2.2-1 becomes 1.54 × 1.12 = 1.73 mmol/(g silica) in Table 2.1.
[2]OH content determined by o-MePhCH₂MgCl titration in THF (see Example 4.1-2).

2.2 Supported Catalyst Preparation Procedures

In the drybox, pentafluorophenol (0.244 g, 1.32 mmol), N,N-dimethylaniline (0.081 g, 0.66 mmol), and 1 g toluene were mixed in a 4 mL vial to make an ionic Bronsted acid ("IBA"). In a 20 mL vial, 1.05 g TEA treated silica from 2.1-1 (Table 2.1) was charged with 4 g toluene. The IBA solution was then slowly added to the TEA treated silica slurry. The resulting mixture was then shaken on a shaker at ambient for 30 min, then heated to 70° C. in an oil-bath and held at that temperature for 30 min. The mixture was then filtered, washed with 3 g toluene, and dried under vacuum for 30 seconds. The wet slurry was then reslurried with toluene (4 g); and rac-ethylenebis(indenyl)zirconium dimethyl (M5) (0.025 g, 66.2 micromol) was added. The mixture was then shaken for 1 hour, filtered, washed three times with 3 g toluene and 5 g isohexane, and then dried under vacuum for 1 hour. The yield was 1.13 g (ICP: Zr: 0.48%; Al: 3.2%). The catalyst data and the propylene polymerization result are listed in Table 2.2, Entry 2.2-1. Other catalysts were prepared using a similar procedures and the yield, analytical, and performance data are provided in Table 2.2, Entries 2.2-2 to 2.2-9.

TABLE 2.2

Silica[1] Supported Metallocene Analytical Data and Polyethylene (PE)/Polypropylene (PP) Performance

| | | Supported Activator | | Final Catalyst | | |
|---|---|---|---|---|---|---|
| Entry | Metallocene[2] (PE/PP) | Support Source | Al on Silica (mmol/g) | IBA Charge (mmol/g) | Al (wt %) | Zr (wt %) | Productivity[5,6] (g/g cat/hr) |
| 2.2-1 | M5 (PE) | 2.1-1 | 1.54 | 0.66 | 3.2 | 0.46 | 9,400 |
| 2.2-2 | M5 (PE) | 2.1-2 | 1.47 | 0.66 | 3.0 | 0.45 | 9,300 |
| 2.2-3 | M5 (PE) | 2.1-3 | 1.55 | 0.70 | 3.1 | 0.37 | 8,800 |
| 2.2-4 | M5 (PE) | 2.1-3 | 1.55 | 0.66 | 3.0 | 0.39 | 7,800 |
| 2.2-5 | M5 (PE) | 2.1-3 | 1.55 | 0.58 | 3.0 | 0.36 | 6,500 |
| 2.2-6 | M4 (PE) | 2.1-3 | 1.55 | 0.66 | 2.3[3] | 0.46 | 6,400 |
| 2.2-7 | M5 (PE) | 2.1-5 | 1.33 | 0.71 | 2.8 | 0.52 | 7,500 |
| 2.2-8 | M5 (PE) | 2.1-4 | 1.28 | 0.41 | 2.9 | 0.41 | 5,600 |
| 2.2-9 | M1 (PP) | 2.1-4 | 1.28 | 0.41 | 3.0 | 0.45 | 15,200 |
| Results from Example 3. Comparative Examples | | | | | | | |
| 3.1 | M5 (PE) | 2.1-7 | 0.90 | 0.66 | 1.28 | 0.27 | 0 |
| 3.2 | M5 (PE) | 2.1-6 | 1.70 | 0.62 | 3.48 | 0.28 | 1,000[4] |
| 3.3 | M1 (PP) | 2.1-6 | 1.70 | 0.57 | 3.62 | 0.28 | 17,000 |

[1]From Grace 952 silica calcined at 200° C. for four hours, except Entry 3.3, which used the same silica but calcined at 600° C. for 4 hours.
[2]rac-ethylenebis(indenyl)zirconium dimethyl (M5); rac-ethylenebis(tetrahydroindenyl)zirconium dimethyl (M4); rac-dimethylsilylbis(2-methyl-4-phenyl-indenyl)zirconium dimethyl (M1)
[3]Heated at 100° C. for 1 hour during IBA treatment
[4]Serious reactor fouling observed
[5]Polymerization conditions for PE: 2 L isobutane solvent, 320 PSI ethylene, 2 mL 10% TIBA in hexane as the scavenger, 80° C., 1 hr
[6]Polymerization conditions for PP: 2.3 L propylene, 2 mL 10% TIBA in hexane as the scavenger, 70° C., 1 hr.

Example 3

Comparative Examples

The examples below are used to show that the supported smaller ligand framework metallocene M5 derived from both high temperature calcined silica (that results in high contents of both isolated hydroxyl groups and strain rings on the surface) and significantly higher $AlR_3$ charge than the ideal 1:2 Al:OH ratio (that results in a significantly higher content of non-chelating aluminum centers) gives either poor productivities or poor polymer morphology, whereas the supported larger ligand framework metallocene M1 analog, which is less sensitive to the surface poisoning species of the support, gives better performance and polymer morphology.

3.1 PE Catalyst Derived from a 600° C. Calcined Silica

The sample preparation procedures were similar to those shown in Example 2, except that a 600° C. calcined silica was used. After 600° C. calcination, the OH content on the silica was significantly less than if was prior to calcination, and therefore the aluminum loading was lower after treatment with organoaluminum compound.

In a drybox, $AlMe_3$ treated silica from Entry 2.1-7 in Table 2.1 (1.0 g) was mixed with toluene (3 g) in a 20 mL vial; IBA made from $C_6F_5OH$ (0.244 g) and $PhNMe_2$ (0.081 g) in toluene (2 g) was slowly added to the aluminum alkyl treated silica slurry, followed by vigorous shaking for 1 hour on a shaker. The mixture was then filtered, washed two times with 3 g toluene, and dried under vacuum for 30 seconds. The wet solid was then reslurried with 3 g toluene. rac-Ethylenebis(indenyl)zirconium dimethyl (M5) (0.024 g) was added and the mixture shaken for 1 hour. The color changed from yellow to red at the beginning. The red color faded with time. After one hour, it became light yellow. The mixture was filtered, washed two times with 3 g toluene and 6 g isohexane, then dried under vacuum for 1 hour. Yield: 1.13 g (ICP: Al: 1.28%; Zr: 0.27%). The polymerization test for this material in a 4 L reactor showed no activity (Table 2.2, Entry 3.1).

The activation behavior (red to light yellow) indicates that the catalyst precursor M5 was activated but quickly interacted with the surface-poisoning sites to become inactive, presumably due to the poisoning strain-ring structure form by high temperature calcination.

3.2 PE Catalyst Derived from the Organoaluminum treated Silica with 1:1.4 of Al:Al—R Ratio In a drybox, $AlMe_3$ treated silica from Entry 2.1-6 in Table 2.1 (1.0 g) was mixed with toluene (3 g) in a 20 mL vial; IBA made from $C_6F_5OH$ (0.230 g) and $PhNMe_2$ (0.075 g) in toluene (2 g) was slowly added to the aluminum alkyl treated silica slurry, followed by vigorous shaking for 1 hour on a shaker. The mixture was then filtered, washed two times with 3 g toluene, and dried under vacuum for 30 seconds. The wet solid was then reslurried with 3 g toluene. M5 (0.014 g) was added and the mixture shaken for 1 hour and placed at ambient conditions overnight. The color changed from yellow to red. The mixture was filtered, washed two times with 3 g toluene and 6 g isohexane, then dried under vacuum for 2 hours. Yield: 1.20 g (ICP: Al: 3.48%; Zr: 0.28%). The polymerization test for this material in a 4 L reactor showed 1,000 g/g cat/hr productivity with serious reactor fouling (Table 2.2, Entry 3.2).

3.2 PP Catalyst Derived from the Organoaluminum Treated Silica with a 1:1.4 of Al:Al—R Ratio

In a drybox, $AlMe_3$ treated silica from Entry 2.1-5 in Table 2.1 (1.0 g) was mixed with toluene (3 g) in a 20 mL vial; IBA made from $C_6F_5OH$ (0.210 g) and $PhNMe_2$ (0.10 g) in toluene (2 g) was slowly added to the aluminum alkyl treated silica slurry, followed by vigorous shaking for 1 hour on a shaker. The mixture was then filtered, washed two times with 3 g toluene, and dried under vacuum for 30 seconds. The wet solid was then reslurried with 3 g toluene. M1 (0.020 g) was added and the mixture shaken for 1 hour and placed at ambient overnight. The color changed from yellow to red. The mixture was filtered, washed three times with 3 g toluene and 8 g isohexane, then dried under vacuum for 1 hours. Yield: 1.14 g (ICP: Al: 3.62%; Zr: 0.28%). The PP polymerization test for this material in a 4 L reactor showed 17,000 g/g cat/hr productivity with good morphology (Table 2.2, Entry 3.3).

Example 4

Evidence of the Chelating Structure of the Bronsted Acidic Aluminate on Silica 4.1 Quantification of the Al to Al—R Ratio for the Intermediate Organoaluminum Treated Silica Si—OH species on silica surface are mainly in isolated (C) and hydrogen bonded (D) forms, respectively, which can be identified by infrared (IR) spectroscopy:

For low temperature calcined silica, hydrogen bonded structure (D) is dominant (see Bartram, et al). When a pair of hydrogen bonded siloxy groups reacts with one trialkylaluminum, a chelating structure forms. A sub-stoichiometric charge of $AlR_3$ allows the formation of such structure. If $AlR_3$ is so charged that the Al to OH ratio is lower than 1:2, residual OH (unreacted) can be present. If the residual OH content becomes significant, catalyst deactivation can occur. Therefore, with the consideration that each isolated OH group (C, minor species) also consumes one organoaluminum compound, a slightly higher $AlR_3$ to OH ratio than 1:2 is used to ensure that no residual OH remains. After the reaction of one $AlR_3$ (containing 1:3 Al:Al—R ratio) with a pair of hydrogen bonded siloxy groups on the silica is complete, the resulting material can have an Al:Al—R ratio very close to 1:1, for example, 1:1.1 to 1.2 (Table 2.1, Entries 2.1-1, 2.1-2, and 2.1-4), due to the loss of two R groups on each of the majority of $AlR_3$ compound. The Al—R:Al ratio can be determined by analytical methods, e.g., ICP for Al content quantification and NMR—$CF_3COOH$ titration for Al-Et content quantification.

4.1-1 NMR—$CF_3COOH$ Titration Method

A specially designed NMR tube consisting of an upper chamber and a TEFLON cap was used. The upper chamber is so designed that when the $CF_3COOH$ solution is loaded in the chamber, there is no contact between the $CF_3COOH$ solution and the organoaluminum treated silica slurry in the lower part of the NMR tube. Then the tube is turned upside down to allow the two reagents to come into contact and react.

In the drybox, exact amounts of both trialkylaluminum treated silica and an internal standard such as 1,2-diphenylethane (DPE) are weighed into the lower part of the NMR tube, respectively. Then a deuterated solvent such as $C_6D_6$ filled into the NMR tube in such a way that the possible head-space is reduced to minimize the error caused by the gas escaping from the solution to the head-space. Then, an excess amount of $CF_3OOH$ solution in the same deuterated solvent is loaded in the upper chamber. The NMR tube was then sealed with the TEFLON cap. The NMR tube is then turned upside down to allow the contact of the two reagents, followed by vigorous shaking for 10 minutes and then settling for 60 minutes. During the period of time, $^1H$—NMR is checked occasionally to ensure that there is no additional formation of alkane (e.g., for TEA treated silica, ethane). With known amounts of both organoaluminum treated silica and the internal reference, the Al—R content can be calculated. This analytical method gives a 95% or better confidence for ethane and isobutane released from the reaction of Al-Et and Al-$^i$Bu fragments on silica with $CF_3COOH$, respectively.

We have observed that the active protons on the support surface responded differently with different methods, different steric bulkiness of the reagents, and different reactivities of the reagents. For example, LOI (loss on ignition) method, a standard method to measure the loss of water on silica with a heating process, uses no reagent. It thus gives a higher active proton number than the number obtained from chemical methods such as TEA titration, Grignard titration, or alkylated metallocene titration (see Example 5), presumably due to the accessibility limit for a chemical to the active protons located in different pore sizes, hidden under the surface, etc. Because a trialkylaluminum (e.g., TEA, TMA, or TIBA) is used to construct the activator sites on silica, TEA titration method is thus used to determine the active proton content, which is called TEA reactive OH (see Example 4.2-1c).

We also used a Grignard reagent o-MePhCH2MgCl to determine the active proton residue after the organoaluminum treatment to ensure that there is no overwhelming Grignard reactive protons. This can prevent possible deactivation of activated metallocene. The use of the Grignard titration method is partly due to the consideration of the pore size response of the Grignard reagent, which is believed to be in between TEA and metallocenes, and mainly due to the consideration of both convenience (simpler procedures than TEA titration) and cost effectiveness (cheaper than alkylated metallocenes). Entry 2.1 -3 in Table 2.1 shows that a trimethylaluminum (TMA) treated silica from a sub-stoichiometric charge of TMA still contains a small amount of active proton residue. However, catalysts derived from this trialkylaluminum treated silica can still be very active (Entries 2.2-3, -4, -5, and -6 in Table 2.2).

4.1-2 Grignard Titration to Determine Active Proton Residue on Organoaluminum Treated Silica In the drybox, an exact amount of organoaluminum treated silica was weighed into a 20 mL vial with a stirbar. $C_6D_6$ was added to the 20 mL vial to make a slurry. Excess o-MePhCH$_2$MgCl THF, which has been calibrated for the content of p-xylene (the product from the reaction of the Grignard reagent with active protons), was added to the slurry and the vial was capped. The resulting mixture was stirred for 1 hour. The difference between the final p-xylene content and the calibrated p-xylene content is from the active proton residue content on the organoaluminum treated silica and can be calculated as a mmol/g unit Results are listed in Table 2.1.

4.2 Chelating Aluminum Center Chemically Bonded to Two Oxygen Atoms on Silica 4.2-1 Surface TEA Reactive OH Quantification on Grace 952 Silica after 200° C. Calcination 4.2-1a Preparation of Excess TEA Treated Silica Silica Grace 952 after 200° C. calcination. (2.50 g) was weighed into a 20 mL vial and mixed with dry toluene (5 g). The slurry was agitated. Triethylaluminum (TEA 1.003 g or 8.78 mmol, based on 3.52 mmol/g $SiO_2$ charge) was weighed into a small vial and mixed with dry toluene (2 g). The TEA solution was then slowly added to the silica slurry. After agitating at ambient conditions overnight, the reaction mixture was filtered, washed 2 times with toluene (2 g) and isohexane (4 g), and dried under vacuum to constant weight. The dry, free flowing powder was 3.2888 g (Solid A) and the combined weight of solvents from the filtration and washes was 14.057 g (Solution B).

4.2-1b Determination of Al-Et:Al Ratio in TEA Treated Silica a) Determination of Al Content on TEA Treated Silica TEA content in Solution B determined by quantitative NMR analysis was 3.48 mmol. The TEA consumed by silica was 8.78−3.48=5.30 mmol on 2.5 g silica or 5.30/2.50=2.12 mmol Al/(g silica). Al content on Solid A as determined by ICP was 4.22%, corresponding to 3.2688*4.22%/(27*2.50)= 2.04 mmol Al/(g silica). The NMR and ICP results agreed with each other.

b) Determination of Al-Et Content on TEA Treated Silica

The content of Al-Et groups on TEA treat silica was quantified with NMR—$CF_3COOH$ titration in a sealed system to give 2.19 mmol ethane/(g TEA treated silica), corresponding to (2.19)(3.2688)/2.50=2.88 mmol ethane/(g silica).

4.2-1c Determination of OH Content on 200° C. Calcined Silica

Since the excess TEA treated silica contains 2.04 mmol Al/(g silica) and 2.86 mmol Al-Et/(g silica) and all Al are from TEA, the loss of Al-Et due to its reaction with OH can be calculated. TEA reactive OH content can therefore be derived:

$$\text{TEA reactive OH} = 2.04 \times 3 - 2.86 = 3.26 \text{ mmol OH/(g silica)}$$

Therefore, on the surface of 200° C. calcined Grace 952 silica, the TEA reactive OH content is 3.26 mmol OH/(g silica).

4.2-2 Calculation of the Al:Al—O Ratio

A chelating Al center to two oxygen atoms on the surface should give a 1:2 Al:Al—O ratio. In the final catalyst, e.g., Entry 2.2-1 in Table 2.2, the Al loading is 3.2% or 1.18 mmol/g. This number is based on the total sample weight. If converting to a value based on the silica, it is 1.18/(74%)= 1.59 mmol Al/(g silica), wherein 74% is the percentage of silica in the final catalyst. Therefore the Al:O—Al ratio=1.59: 3.28, very close to a 1:2 ratio. The same calculation can be done for Entries 2.2-2 to 2.2-9, which have Al loadings close to 3.0 and less than 3.2 to obtain the O—Al:Al ratios close to 2:1, indicating the majority of Al atoms are in the chelating structure.

Examples 4.1 and 4.2 indicate that the chelating Al structure is carried on from the intermediate organoaluminum treated silica to the final catalyst composition.

Example 5

Figure 2:
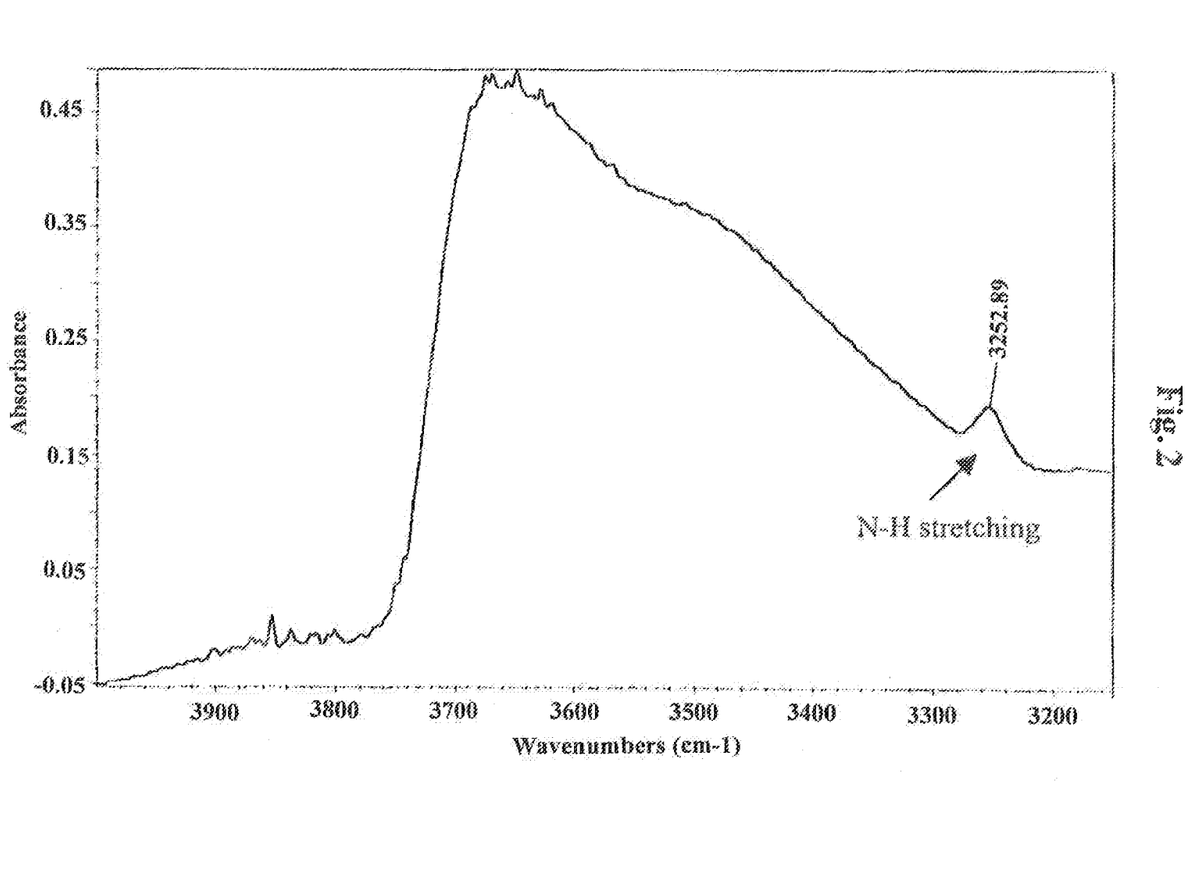
FIG. 2 is an IR spectrum obtained from TEA treated silica after IBA treatment.

Evidences of Bronsted Acidic Cation and Bronsted Acid Activation Mechanism 5.1 Infrared (IR) Spectroscopy Evidence of Bronsted Acidic Cation The IR spectrum of FIG. 2 was obtained from TEA treated silica after IBA treatment. It clearly shows a N—H stretching frequency at 3250$^{-1}$, indicating that a Bronsted acidic cation [HNPhMe$_2$]$^+$ is present.

5.2 Infrared (IR) Spectroscopy Evidence of Bronsted Acid Activation

Figure 3:
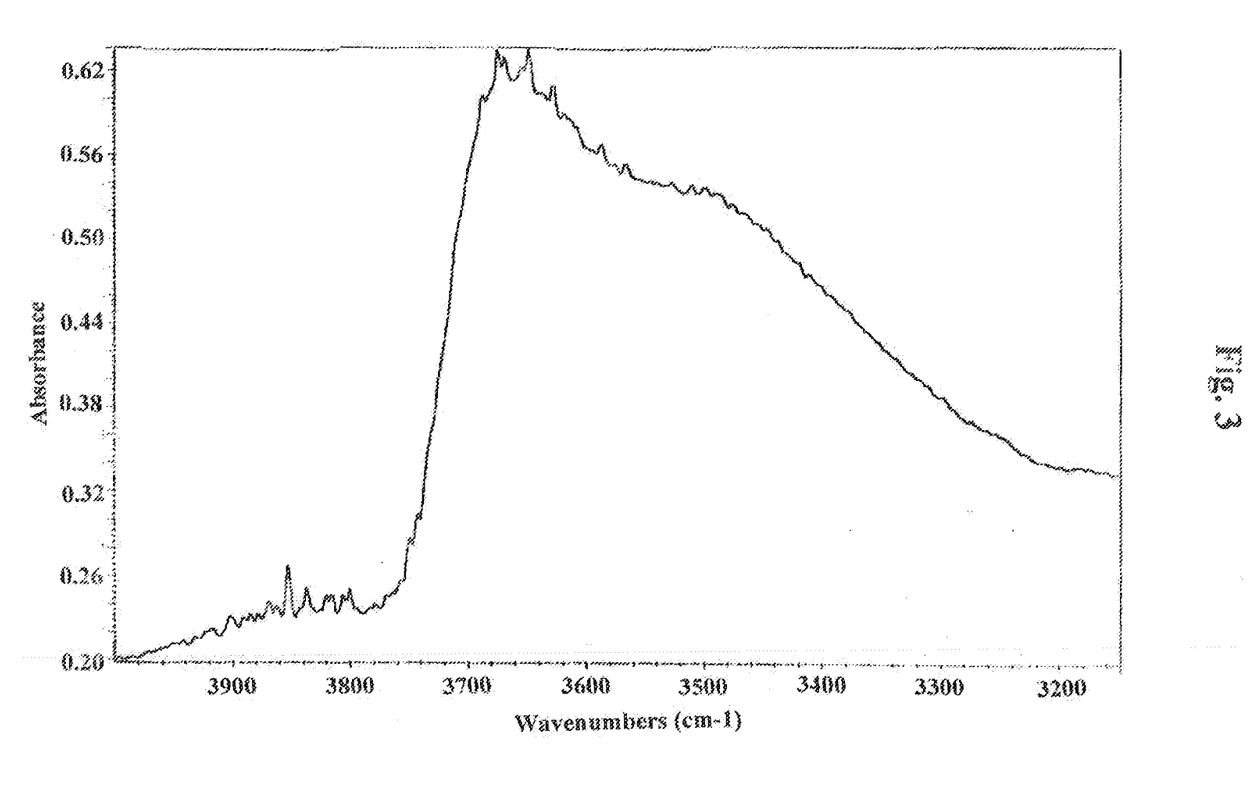
FIG. 3 is an IR spectrum obtained from the final catalyst derived from the reaction of an alkylated metallocene with TEA treated silica after IBA treatment.

The IR spectrum of FIG. 3 was obtained from the final catalyst derived from the reaction of an alkylated metallocene with TEA treated silica after IBA treatment, wherein the N—H stretching frequency is gone. This example, along with Example 5.3 below, indicates a Bronsted acid activation mechanism.

5.3 Methane Titration Evidence of Bronsted Acid Activation

The NMR titration method described in Example 4.1 was modified to quantify the reaction of methylated metallocene (M5) with the supported activator (TEA treated silica after IBA treatment). The lower part of the NMR tube was charged with the supported activator slurried in a deuterated solvent C$_5$D$_6$. M5, based on Zr loading 0.45%, was loaded in the upper chamber of the NMR tube. After mixing, the methane released from the reaction was quantified as 0.0160 mmol vs. the M5 charge of 0.0164 mmol, indicating more than 90% M5 was activated through the reaction with the Bronsted acidic cation.

It is to be understood that the reactants and components referred to by chemical name or formula anywhere in the specification or claims hereof, whether referred to in the singular or plural, are identified as they exist prior to being combined with or coming into contact with another substance referred to by chemical name or chemical type (e.g., another reactant, a solvent, or etc.). It matters not what chemical changes, transformations and/or reactions, if any, take place in the resulting mixture or solution or reaction medium as such changes, transformations and/or reactions are the natural result of bringing the specified reactants and/or components together under the conditions called for pursuant to this disclosure. Thus the reactants and components are identified as ingredients to be brought together in connection with performing a desired chemical reaction or in forming a mixture to be used in conducting a desired reaction. Accordingly, even though the claims hereinafter may refer to substances, components and/or ingredients in the present tense ("comprises", "is", etc.), the reference is to the substance, component or ingredient as it existed at the time just before it was first contacted, combined, blended or mixed with one or more other substances, components and/or ingredients in accordance with the present disclosure. Whatever transformations, if any, which occur in situ as a reaction is conducted is what the claim is intended to cover. Thus the fact that a substance, component or ingredient may have lost its original identify through a chemical reaction or transformation during the course of contacting, combining, blending or mixing operations, if conducted in accordance with this disclosure and with the application of common sense and the ordinary skill of a chemist, is thus wholly immaterial for an accurate understanding and appreciation of the true meaning and substance of this disclosure and the claims thereof.

While the present invention has been described in terms of one or more preferred embodiments, it is to be understood that other modifications may be made without departing from the scope of the invention, which is set forth in the claims below.

What is claimed is:

1. A composition comprising:
   a) a Bronsted acidic cation [Q$_m$H]$^+$, wherein H is a proton, m is 1 or 2, each Q is Lewis base, and each Lewis base Q can be the same as, or different from, any other Lewis base Q; and
   b) aluminate anion chemically bonded to at least one type of carrier, wherein each of a majority of aluminum atoms in the aluminate anion is chemically bonded to at least two oxygen atoms on the surface of the carrier forming chelating aluminum centers.

2. The composition of claim 1 wherein the carrier contains at least two hydroxyl groups.

3. The composition of claim 2 wherein a majority of the hydroxyl groups are in hydrogen bonded form.

4. The composition of claim 1 derived from at least:
   a) the carrier, said carrier having at least two hydroxyl groups;
   b) organoaluminum compound;
   c) the Q$_m$, and
   d) Bronsted acid.

5. The composition of claim 4 wherein a majority of the hydroxyl groups are in hydrogen bonded form.

6. The composition of claim 4 further comprising an alkylated transition metal component.

7. The composition of claim 6 wherein a majority of the hydroxyl groups are in hydrogen bonded form.

8. The composition of claim 6, wherein the carrier comprises an inorganic oxide.

9. The composition of claim 8, wherein the inorganic oxide has a micro pore volume of not less than about 0.3 ml/g and an average particle diameter of about 10 micrometers to about 500 micrometers.

10. The composition of claim 8 wherein the inorganic oxide comprises silica, alumina, silica-alumina, magnesia, titania, zirconia, or clays.

11. The composition of claim 8 wherein the inorganic oxide comprises silica.

12. The composition of claim 11 wherein the silica is non-calcined.

13. The composition of claim 6 wherein the carrier was calcined at a temperature up to 400° C., or at a temperature of about 100° C. to about 400° C.

14. The composition of claim 6 wherein the organoaluminum compound comprises AlR$_n$(XR$^1$)$_{(3-n)}$ wherein
   Al is aluminum;
   each R is hydrogen or a hydrocarbyl group having up to about 20 carbon atoms, and each R may be the same as, or different from, any other R;
   for each XR$^1$, X is a hetero atom and R$^1$ is an organic group bonded to the Al through the hetero atom and having up to about 20 carbon atoms;
   each XR$^1$ may be the same as, or different from, any other XR$^1$; and
   n is 1, 2, or 3.

15. The composition of claim 6 wherein the organoaluminum compound comprises triethylaluminum, triisobutylaluminum, trimethylaluminum, trioctylaluminum, diisobutylaluminum hydride, diethylaluminum hydride, dimethylaluminum hydride, (2,6-di-tert-butyl-4-methylphenoxy)diisobutylaluminum, bis(2,6-di-tert-butyl-4-methylphenoxy) isobutylaluminum, (2,6-di-tert-butyl-4-methylphenoxy)diethylaluminum, bis(2,6-di-tert-butyl-4-methylphenoxy)ethylaluminum, (2,6-di-tert-butyl-4- methylphenoxy) dimethylaluminum, or bis(2,6-di-tert-butyl-4-methylphenoxy) methylaluminum.

16. The composition of claim 6 wherein the ratio of (mmol OH on the carrier)/(g carrier) to (mmol organoaluminum compound)/(g carrier) is from about 1.80:1 to about 2.20:1.

17. The composition of claim 6 wherein the Lewis base comprises a tertiary amine $NR^2_3$, wherein each $R^2$ is hydrogen or hydrocarbyl group having up to about 20 carbon atoms, and each $R^2$ may be the same as, or different from, any other $R^2$.

18. The composition of claim 6 wherein i) the Lewis base comprises N,N-dimethylaniline, N,N-dimethylbenzylamine, triethylamine, or trimethylamine, or ii) wherein the Bronsted acid comprises pentafluorophenol, 2,6-difluorophenol, or 4-fluorophenol; or iii) combinations of i) and ii).

19. The composition of claim 6, wherein the composition is suitable for activating an alkylated transition metal component by protonation.

20. A method of polymerizing monomer comprising combining a composition according to claim 6, and a monomer.

21. A composition comprising:
a) carrier having at least two hydroxyl groups;
b) an organoaluminum compound comprising $AlR_n(XR^1)_{(3-n)}$ wherein
   Al is aluminum;
   each R is hydrogen or a hydrocarbyl group having up to about 20 carbon atoms, and each R may be the same as, or different from, any other R;
   for each $XR^1$, X is a hetero atom and $R^1$ is an organic group bonded to the Al through the hetero atom and having up to about 20 carbon atoms;
   each $XR^1$ may be the same as, or different from, any other $XR^1$, and
   n is 1, 2, or 3;
c) Lewis base; and
d) a Bronsted acid,
wherein the ratio of (mmol OH on the carrier)/(g carrier) to (mmol organoaluminum compound)/(g carrier) is from about 1.80:1 to about 2.20.

* * * * *

UNITED STATES PATENT AND TRADEMARK OFFICE
CERTIFICATE OF CORRECTION

PATENT NO.         : 8,501,655 B2                                    Page 1 of 1
APPLICATION NO.    : 12/442345
DATED              : August 6, 2013
INVENTOR(S)        : Luo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 577 days.

Signed and Sealed this

Fifteenth Day of September, 2015

Michelle K. Lee
*Director of the United States Patent and Trademark Office*